July 6, 1948.  A. J. SOLARI  2,444,713

PRESSED-IN PACKAGE TYPE ROTARY SEAL

Filed Sept. 7, 1946

INVENTOR.
Archie J. Solari
BY Charles P. Vajtech
Atty.

Patented July 6, 1948

2,444,713

UNITED STATES PATENT OFFICE 2,444,713

PRESSED-IN PACKAGE TYPE ROTARY SEAL

Archie J. Solari, Chicago, Ill., assignor to Crane Packing Company, Chicago, Ill., a corporation of Illinois Application September 7, 1946, Serial No. 695,399

6 Claims. (Cl. 286—11)

This invention relates to rotary seals for effecting a seal between relatively rotatable parts and particularly to rotary seals wherein all parts thereof are adapted to be handled as a single unit or package.

The principal object of this invention is to provide a rotary seal of the package type for relatively rotatable elements wherein one of the relatively rotatable units thereof is merely pressed into place in a recess in one of the elements to be sealed and the other is locked to the other element by a simple set screw or the like.

A more specific part of this invention is to provide a package type rotary seal for effecting a seal between a shaft and a housing therefor wherein the part of the seal associated with the shaft is comprised of a collar adapted to be fixed to the shaft the collar being provided with a groove in which resides a lug on the seal part associated with the housing to hold the collar in assembled relation to the remainder of the seal.

Another specific object of this invention is to provide a package type seal for effecting a seal between the shaft and a housing therefor, wherein the part associated with the housing is sealed thereto by means of a flexible resilient ring of rubber or the like which is compressed between that part and the housing so that no additional means is required to hold that part of the seal in place.

Figure 1:
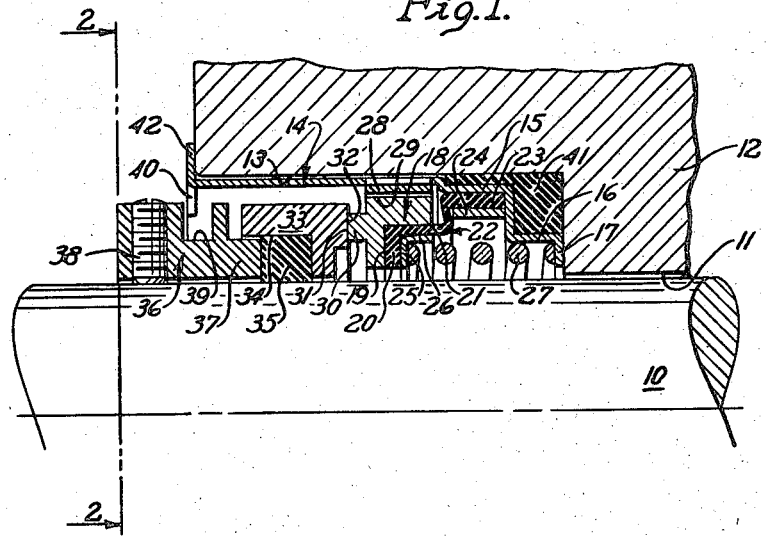
Figure 2:
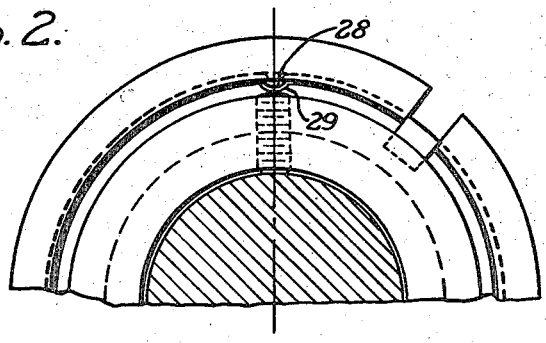
Figure 3:
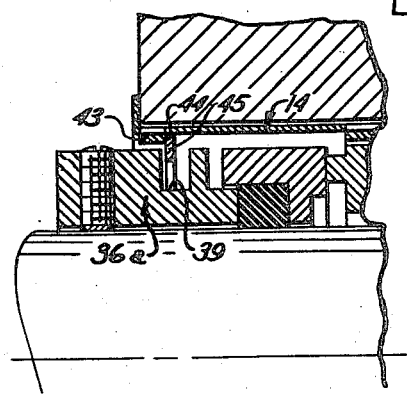

Other objects of this invention will become apparent from the following detailed description when taken together with the accompanying drawings, in which Fig. 1 is a section through a seal embodying this invention, the seal being shown installed in a recess in a housing and providing a seal between the housing and a shaft;

Fig. 2 is a view taken along lines 2—2 of Fig. 1 showing the details of construction of certain elements of the seal; and Fig. 3 is a fragmentary section of a modified form of the seal of Fig. 1.

Referring now to Fig. 1 for a detailed description of the invention, there is shown a fragment of a shaft 10 which passes through an opening 11 in a housing 12 or other support for shaft 10, said housing being provided with an annular recess 13 opening upon the left-hand side (Fig. 1) of housing 12 and adjacent shaft 10. Disposed within recess 13 is a tube 14 of rigid material which is impervious to the fluid to be sealed, said tube having a pair of steps 15 and 16 near the right-hand (Fig. 1) end thereof. Step 16 terminated in a radially inwardly disposed flange 17.

Within tube 14 is a sealing washer 18 of wear-resistant low friction material, said washer having a recess 19 formed therein in which is retained a flange 20 and connecting cylindrical portion 21 of a flexible resilient sealing element 22. Said sealing element 22 is preferably made of a rubber-like material so as to be able to resist the disintegrating action of the greatest number of fluids commonly sealed. A relatively thick cylindrical portion 23 consititutes the right-hand end of sealing element 22, said cylindrical portion 23 being compressed against step 15 by a rigid band 24 so as to form a fluid-tight seal between sealing element 22 and tube 14.

Flange 20 of sealing element 22 is pressed against recess 19 in washer 18 by means of a ferrule 25 having an axial flange 26 thereon, ferrule 25 in turn being held against flange 20 by a helical spring 27 compressed between flange 17 on tube 14 and ferrule 25. The step 16 in tube 14 serves to center the right-hand end (Fig. 1) of spring 27 while the axial flange 26 on ferrule 25 serves to center the opposite end of said spring.

Washer 18 is made to fit loosely within tube 14 but is nevertheless sufficiently closely dimensioned so as to be centered and guided thereby. Substantially all torque is removed from sealing element 22 by means of an axially slidable driving connection provided between washer 18 and tube 14. This connection is constituted by one or more lugs 28 which are formed in tube 14 and which extend into correspondingly formed slots or notches 29 in the outer periphery of washer 18.

Washer 18 is formed with an annular rib or sealing nose 30 having a radially disposed surface 31 thereon which is rendered perfectly flat by any suitable grinding or lapping operation. Said surface 31 abuts on a radially disposed surface 32 on a ring 33, the surface 32 being likewise rendered perfectly flat and smooth by suitable grinding or lapping operations. Said ring 33 has a recess 34 formed therein facing upon shaft 10, the recess being used to retain a resilient deformable ring 35 of rubber or the like which is initially formed with an outside diameter greater than the internal diameter of recess 34 such that when in place in the recess, ring 35 will be in compression and will form a fluid-tight seal between ring 33 and shaft 10.

To prevent rings 33 and 35 from sliding axially on shaft 10 under the action of spring 27, an abutment is provided. This abutment is comprised of a collar 36 having one end 37 telescoped within recess 34 with a loose fit and abutting on ring 35.

Collar 36 is secured to shaft 10 by one or more set screws 38 so that relative axial movement between collar 36 and shaft 10 is not possible after the seal is installed. It will be apparent that with collar 36 fixed to shaft 10, the pressure of spring 27 merely causes resilient deformable ring 35 to be more firmly compressed in recess 34.

The parts of the seal thus far described constitute the elements which make up the "package" to be shipped by the seal manufacturer to the customer. In order to make sure that collar 36 and its associated rings 33 and 35 will not become separated from the remainder of the seal, the collar 36 is interlocked with respect to the tube 14. Collar 36 is formed with a peripheral groove 39 into which are bent tabs 40 so that the sides of groove 39 will strike tabs 40 and hence will cause collar 36 to be held in assembled relation with respect to the remainder of the seal.

The parts thus far described are assembled at the seal manufacturer's establishment by first assembling a flexible sealing element 22 with respect to a washer 18, then inserting a band 24 into the cylindrical end 23 of the sealing element and placing a ferrule 25 against flange 20 of said sealing element 22. Next a spring 27 is placed against flange 17, the spring being centered by step 16 and the washer; sealing element 22, band 24 and ferrule are then inserted into a tube 14 through the left-hand end as viewed in Fig. 1, care being taken to align notches 29 with lugs 28 before end 23 is compressed against step 15 by band 24. The lugs 28 may be made quite long for this purpose. When the notches 29 and lugs 28 are properly aligned, the washer 18 is pressed into the tube, the pressure causing band 24 and end 23 to be fitted tightly upon step 15. The final procedure is to assemble resilient ring 35 within the recess 34 of a ring 33 and then sliding the collar 36 behind the ring 35 in recess 34. These last three mentioned parts are then pressed into tube 14 against the action of spring 27 and the tabs 40 are bent radially inwardly until they extend into groove 39. Collar 36 may then be released and the pressure of spring 27 will cause the sleeve to be pushed to the left as viewed in Fig. 1 until the right-hand edge of groove 39 rests against tabs 40.

In order to insure a perfect seal between tube 14 and recess 13, packing material 41 is slipped over the steps 15 and 16 of tube 14, the packing preferably being of a type which has a relatively high degree of friction and the outside diameter of the packing being preferably greater than the internal diameter of recess 13. Thus, when installed in a housing 12, packing 41 is compressed between tube 14 and the interior of recess 13 and consequently forms a fluid-tight seal between the tube and housing. The packing 41 need not encompass both steps 15 and 16, but to avoid reduction in compression pressure due to flow of the packing material when the latter is unconfined it is desirable to fill the space between the tube and recess as completely as possible.

When the customer receives a "package" of the type described he has all the parts necessary to effect a seal between a housing 12 and a shaft 10 passing therethrough. To install the seal, the customer merely presses tube 14 with packing 41 thereon into recess 13 until flange 17 abuts on the bottom of the recess. Alternatively, tube 14 may be provided with an external radially outwardly disposed flange 42 which will serve to limit the movement of the seal into recess 13. After tube 14 is placed in recess 13, collar 36, having previously been held in its extreme left-hand position relative to tube 14 by spring 27 and also by the friction between ring 35 and shaft 10, is moved slightly to the right so that lug 40 rides approximately in the center of groove 39. Collar 36 is then held in this position while the set screws 38 are tightened upon shaft 10. The seal is now completely installed and ready for use.

Where relatively high spring pressures are necessary for spring 27, the tabs 40 may not have the requisite strength to maintain collar 36 within tube 14. For a stronger and simpler construction, therefore, the modification shown in Fig. 3 may be used. Referring now to Fig. 3, it will be observed that in place of the tabs 40, tube 14 is formed with a plurality of lugs 43 which extend radially inwardly to form abutments 44 at their right-hand ends as shown in Fig. 3. A snap ring 45 is collapsed within lugs 43 and groove 39 as the collar 36 is assembled with respect to tube 14 and when the snap ring 45 clears lugs 43 it will expand into contact with the inside of tube 14. It is contemplated that the inside diameter of snap ring 45 will be smaller than the outside diameter of collar 36a so that when the sleeve is released after assembly within tube 14, spring 27 will cause the sleeve to abut on snap ring 45 and thus to be held in place relative to tube 14. In all other respects, the modification shown in Fig. 3 may be identical with the form shown in Fig. 1.

The ease of installation inherent in the package type seals hereinbefore described is self-evident. In addition to this advantage, the seals just described also reduce the number of rotating parts and enable one size of tube and associated parts to be used for several sizes of shaft, the differences in shaft diameter being taken care of by merely changing the size of the sealing surface 32 on ring 33 and also the diameter of ring 35 and collar 36.

It is understood that the foregoing description is illustrative of preferred embodiments of this invention and that the scope of the invention is not to be limited thereto, but is to be determined by the appended claims.

What is claimed is:

1. A self-contained seal device for effecting a fluid-tight seal between relatively rotatable elements, one of said elements having an annular recess therein, said seal comprising a sealing ring encircling the other of the relatively rotatable elements, said ring having a recess opening upon the other relatively rotatable element, packing means in the recess and compressed between the ring and other relatively rotatable element to effect a fluid-tight seal therebetween, a collar likewise encircling the other element and having one end abutting on the packing to retain the packing in the recess, a sleeve on the said other element, an annular groove on the exterior of the sleeve, a tube in the recess of the said one relatively rotatable element, means for effecting a fluid-tight seal between the tube and the walls of the recess, means for effecting a fluid-tight seal between the tube and ring, and a radially inwardly disposed abutment carried by the tube and extending into the groove in the sleeve to limit relative axial movement between the tube and sleeve in at least one direction.

2. A self-contained seal device as described in claim 1, said tube having a stepped region at one end, said means for effecting a fluid-tight seal between the tube and the walls of the recess comprising packing adapted to be compressed between the stepped region and the walls of the recess, said packing serving to support the tube in the recess.

3. A self-contained seal device as described in claim 1, said abutment comprising a tab on the tube.

4. A self-contained seal device as described in claim 1, said abutment comprising a contractible ring and a plurality of lugs on the inside of the tube for limiting axial movement of the ring relative to the tube.

5. A self-contained seal device for effecting a fluid-tight seal between a shaft and a recessed housing therefor, said seal comprising a rigid tube having portions of progressively smaller diameter at one end to form a plurality of steps, a flange extending radially inwardly from the end of the smallest diameter step, a sealing washer within the tube having axial slots in the outer periphery thereof, lugs on the interior of the tube adapted to ride in the slots to prevent relative rotation between the tube and sealing washer while permitting relative axial movement therebetween, sealing means for effecting a fluid-tight seal between the washer and tube, said sealing means comprising a resilient deformable sleeve having one end in contact with the interior of one of the stepped regions on the tube and the other end in contact with the washer, spring means compressed between the flange on the tube and the end of the resilient deformable sleeve in contact with the washer, a rigid sealing ring surrounding the shaft and having a running fit with the sealing washer, a ring of packing adapted to be compressed between the rigid sealing ring and shaft to effect a seal therebetween and to prevent relative rotation between the sealing ring and shaft, and means for holding the packing and sealing ring in the tube, said last-mentioned means comprising a collar adapted to be secured to the shaft, said collar abutting on the packing and having a peripheral groove, and a radial projection on the tube extending into the groove.

6. A self-contained seal device as described in claim 5, and a ring of packing mounted on one of the stepped portions of the tube and having an outside diameter which is greater than the outside diameter of the tube such that when the tube is inserted in the recess in the housing, the packing on the stepped portion will be compressed and will form a fluid-tight seal between the tube and housing.

ARCHIE J. SOLARI.

REFERENCES CITED

The following references are of record in the file of this patent:

UNITED STATES PATENTS

| Number | Name | Date |
|---|---|---|
| 2,076,716 | Fretter | Apr. 13, 1937 |
| 2,247,505 | Kohler | July 1, 1941 |
| 2,347,118 | Matter | Apr. 18, 1944 |